United States Patent [19]

Follett et al.

[11] Patent Number: 4,870,637
[45] Date of Patent: Sep. 26, 1989

[54] OPTICAL BACKPLANE

[75] Inventors: David R. Follett, Succasunna; David L. Sobin, Middletown, both of N.J.

[73] Assignees: American Telephone and Telegraph Company, New York, N.Y.; AT&T Bell Laboratories, Murray Hill, N.J.

[21] Appl. No.: 137,696

[22] Filed: Dec. 24, 1987

[51] Int. Cl.$^4$ .............................................. H04B 9/00
[52] U.S. Cl. ...................................... 370/4; 455/600; 455/612
[58] Field of Search ............... 455/600, 606, 607, 608, 455/612, 617, 618, 619; 370/3, 4, 1

[56] References Cited

U.S. PATENT DOCUMENTS

| | | | |
|---|---|---|---|
| 4,227,260 | 10/1980 | Vojvodich et al. | 455/601 |
| 4,261,641 | 4/1981 | Porter | 350/96.16 |
| 4,417,334 | 11/1983 | Gunderson et al. | 370/85 |
| 4,457,581 | 7/1984 | Johnson et al. | 350/96.16 |
| 4,494,185 | 1/1985 | Gunderson | 455/607 |
| 4,630,254 | 12/1986 | Tseng | 370/1 |
| 4,654,889 | 3/1987 | Shutterly | 455/601 |
| 4,709,415 | 11/1987 | Prisco | 455/600 |
| 4,733,093 | 3/1988 | Graves | 955/606 |
| 4,776,041 | 10/1988 | Husbands | 455/607 |

FOREIGN PATENT DOCUMENTS

| | | | |
|---|---|---|---|
| 3508417 | 9/1986 | Fed. Rep. of Germany | 455/600 |
| 0153344 | 9/1984 | Japan | 455/608 |
| 0126727 | 6/1987 | Japan | 455/600 |

OTHER PUBLICATIONS

E. G. Rawson et al.-"Fibernet: Multimode Optical Fibers for Local Computer Networks", IEEE Trans. on Communications, vol. COM-26, No. 7, (Jul. 1978), pp. 983-990.

E. G. Rawson-"The Fibernet II Ethernet-Compatible Fiber-Optic LAN," Journal Lightwave Technology, vol. LT-3, No. 3, (Jun. 1985), pp. 496-501.

Farrington et al., "An Optical Fiber, Multi-Terminal Data System for Aircraft" Conference: Electromagnetic Wave Propagation Panel/Avionics Panel Joint Symposium, May 16-20, 1977, pp. 50-1 to 50-12.

Primary Examiner—Benedict V. Safourek
Assistant Examiner—Leslie Van Beek
Attorney, Agent, or Firm—Erwin W. Pfeifle

[57] ABSTRACT

The present invention relates to an optical backplane for use in a switching system or computer for interconnecting a plurality of associated circuit modules. The backplane comprises a switch which is interconnected to each of the associated circuit modules by a separate multifiber ribbon, each ribbon including (1) a plurality of transmit and receive optical fibers, and (2) an optical fiber for providing concurrent synchronization signals to each of the associated circuit modules. The switch includes a switching block for coupling parallel optical signals received from the plurality of receive optical fibers in any multifiber ribbon, transmitted by a sending module, to the transmit fibers of each of the multifiber ribbons for transmission to all of the modules associated with the optical backplane. The switch also includes a timing generation block which generates an optical timing signal that is simultaneously distributed to the separate optical fibers in each of the multifiber ribboons in order to concurrently synchronize all of the associated modules. Each of the associated modules is connected to the backplane via the separate associated optical multifiber ribbon, and includes (1) an interface logic block for interfacing an associated user circuit to the optical backplane, and (2) a means for permitting the module to contend for access to the optical backplane.

10 Claims, 5 Drawing Sheets

50

OPTICAL BACKPLANE

TECHNICAL FIELD

The present invention relates to an optical backplane architecture and, more particularly, an optical backplane comprised of active and passive optical components that provide optical interconnects between a plurality of circuit modules.

DESCRIPTION OF THE PRIOR ART

The number of computers being used in society is continuously explanding as more people acquire computer expertise and the cost of computer hardware declines. This expansion in the use of computers in the office and home has decentralized computer resources and has created a need for improved interconnects and networking between computers. In addition to this decentralization, the speeds at which computers operate and communicate with each other and terminals have also increased. This, in turn, is creating a demand upon networking and backplane technology to provide not only higher speed networks but higher speed nodes, or switching systems and computers, within these networks.

For example, networking technology has attempted to responded to the demand caused by the expansion and decentralization in computer use by providing a number of networking systems having relatively high speeds. However, a problem that is common among high speed switching systems is their limitation on internal, or intranode, data rates due to their electrical backplanes. Electrical backplanes currently used to interconnect the circuit modules within a switching node limit the data bandwidth through the switching node. The bandwidth limitations of electrical backplanes result from the increase in their system parasitics at higher data rates and their susceptibility to electromagnetic radiation. As the demand for higher speed switching systems increases, electrical backplanes will be an even greater obstacle to providing higher speed networks. Finding alternate approaches to designing and constructing higher speed backplanes for switching systems is imperative.

Fiber optic technology has penetrated the long distance communications market as a point-to-point transmission media and has been implemented to provide higher speed communications between nodes in local-area networks. U.S. Pat. No. 4,654,889 issued to H. B. Shutterly on Mar. 31, 1987 describes a multi-star fiber optic communication network having subnetworks of terminals with access control being localized to each individual subnetwork, and communication between subnetworks being conducted over a bus via non-interfering optical channels by using light sources having different wavelengths or by modulating light at different channel frequencies. An optical configuration for interconnecting a network of terminals is disclosed in U.S. Pat. No. 4,457,581 issued to D. C. Johnson et al. on July 3, 1984 and comprises hybrid transmission-reflection star couplers that are interconnected by their transmission ports with the terminals being connected to the reflection ports of the hybrid couplers. In addition, U.S. Pat. No. 4,417,334 issued to R. O. Gunderson et al. on Nov. 22, 1983 describes a data processing system having a plurality of stations grouped into subsystems and interconnected by two optical channels with each channel including a star coupler. These references are all directed to point-to-point long distance and local-area optical fiber networks. As optical fiber continues to be the technology of choice in the design of these networks, and more and more nodes within these networks are interconnected using optical fiber, the problem of bandwidth limitations due to the electrical backplanes within each node will become even more evident. The prior art appears to provide novel approaches or improvements to the design and topology of networks, but does not address the problems associated with and caused by the use of electrical backplanes within the nodes of a network.

The problem remaining in the prior art is to provide a high speed backplane for interconnecting circuit modules within the nodes of a network or within any other computer systems that require high bandwidth and data rates between circuit modules.

SUMMARY OF THE INVENTION

The foregoing problem in the prior art has been solved in accordance with the present inention which relates to an optical backplane architecture for a switching system or computer, wherein the optical backplane comprises active and passive optical components that provide optical interconnects between a plurality of N circuit modules associated with the optical backplane. More particularly, the optical backplane comprises a switch that includes at least one optical computer for optically coupling a plurality of transmit ports on one of the N modules to a plurality of receive ports on all of the N modules connected to the backplane. There is at least one coupler in the backplane for each type of information signal to be transmitted on the backplane. All of the transmit ports on the N modules corresponding to the same type of information signal are optically connected to the input side of a corresponding coupler in the switch and the output side of the coupler is optically connected to all of the receive ports on the N modules corresponding to that type of information signal. Additionally, the switch includes a means for synchronizing all of the N circuit modules.

Other and further aspects of the present invention will become apparent during the course of the following description and by reference to the accompanying drawings.

DETAILED DESCRIPTION

Figure 1:
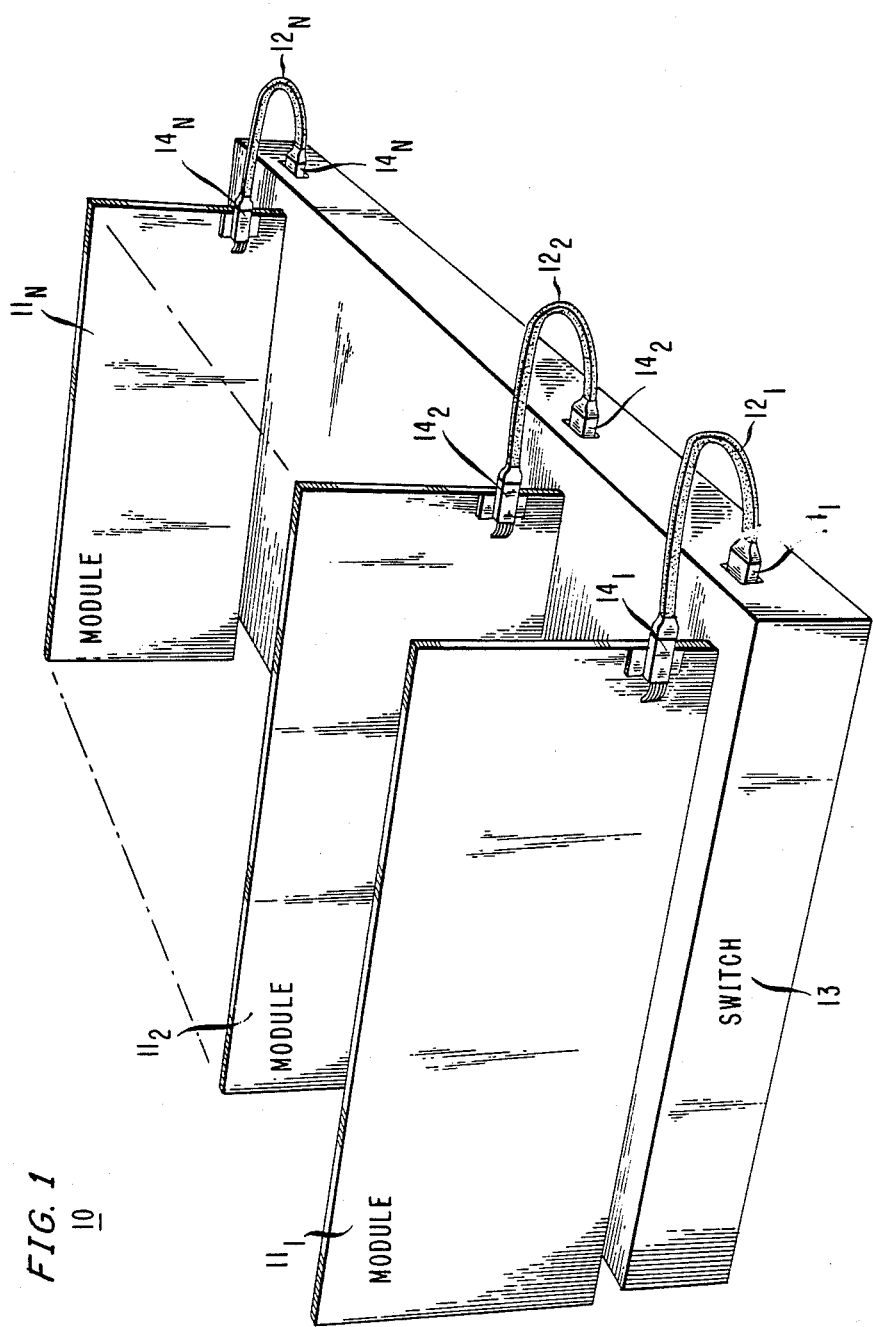
FIG. 1 is a simplified block diagram in perspective of an optical backplane in accordance with the present invention.

FIG. 1 shows a simplified block diagram of a preferred embodiment of an optical backplane 10 in accordance with the present invention. Optical backplane 10 comprises a switch 13 which functions to permit interconnection thereto of up to a plurality of N modules $11_1$–$11_N$ which are to be associated with backplane 10. For purposes of explanation hereinafter, it will be considered that a full compliment of N modules $11_1$-$11_N$ are present and associated with backplane 10, but it should be understood that a lesser amount of modules 11 could be associated with backplane 10 depending on the present need of the system. Switch 13 includes a plurality of N exemplary multifiber connectors $14_1$-$14_N$, with each multifiber connector 14, being connected via an exemplary separate multifiber ribbon $12_i$ to a similar multifiber connector $14_i$ on an associated correspondingly numbered module $11_i$, when that module is present. Each of the N possible multifiber ribbons $12_1$-$12_N$ comprises a plurality of optical fibers, each optical fiber of a multifiber ribbon $12_i$ being used for propagating a separate optical information signal between switch 13 and the associated module $11_i$ being interconnected to backplane 10.

Figure 2:
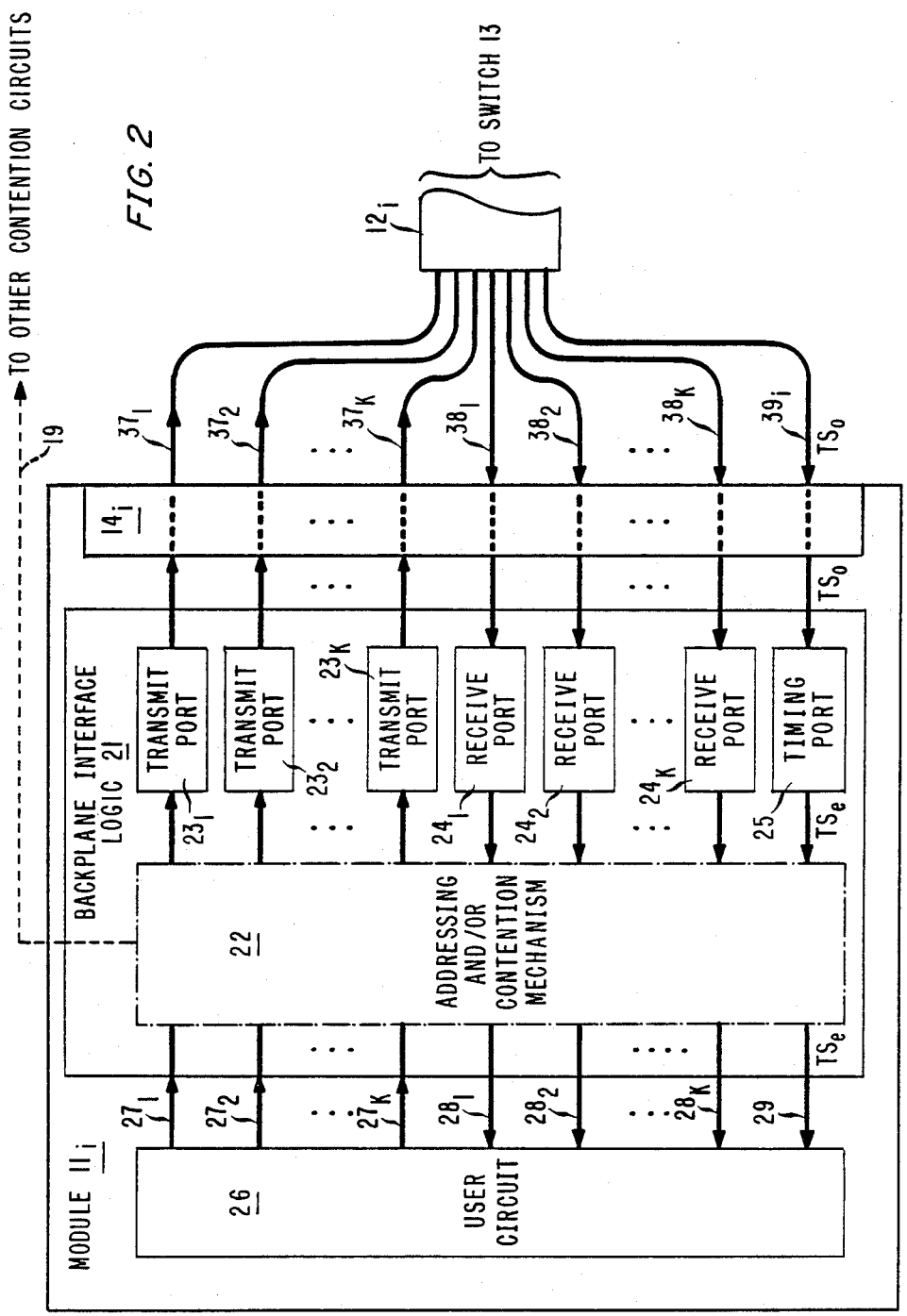
FIG. 2 is a block diagram of a module shown in the optical backplane of FIG. 1.

Optical backplane 10, in its preferred form, is an interfacing system used to interconnect, in a closely coupled hardware configuration, a plurality of N modules $11_1$-$11_N$, with each separate module $11_i$ providing an interface between the optical backplane 10 and a separate associated user circuit 26 (shown in FIG. 2). Optical backplane 10 in FIG. 1 can have an exemplary actual physical embodiment of a conventional card mounting frame commonly used to both mount and electrically interconnect circuit cards. However, in accordance with the present invention the circuit cards or modules $11_1$-$11_N$ are interconnected optically rather than electrically.

In FIG. 2, a block diagram of an exemplary module $11_i$ is shown, wherein module $11_i$ comprises a multifiber connector $14_i$ and a backplane interface logic block 21. Backplane interface logic block 21 is shown as comprising a plurality of K transmit ports $23_1$-$23_K$, a plurality of K receive ports $24_1$-$24_K$, a timing port 25, and an optional addressing and/or contention mechanism 22. Each of the transmit ports $23_1$-$23_K$ and receive ports $24_1$-$24_K$ on module 11]hd i ]l are optically connected by the multifiber connector $14_i$ to a separate preassigned optical fiber $37_1$-$37_K$ and $38_1$-$38_K$, respectively, in multifiber ribbon $12_i$ which terminates at the other end at switch 13. The transmit ports $23_1$-$23_K$ provide two functions: (1) they concurrently convert the associated electrical signals received from addressing and/or contention mechanism 22 into optical signals, and (2) they transmit these optical signls forming a transmission in parallel through their preassigned optical fibers $37_1$-$37_K$ in multifiber ribbon 12(]hd i]l) to switch 13. The receive ports $24_1$-$24_K$ do the converse of the transmit ports 23, and receive the optical signals forming a transmission in parallel from their preassigned optical fibers $38_1$-$38_K$ and concurrently convert these received parallel optical signals into electrical signals. The electrical signals from receive ports $24_1$-$24_K$ are then sent to addressing and/or contention mechanism 22 which then sends them to an associated user circuit 26.

The operation of timing port 25 is similar to that of receive ports 24, in that timing port 25 receives an optical timing signal (TS$_o$) from an optical fiber $39_i$, preassigned to carry the optical timing signal (TS$_o$), in multifiber ribbon 12]hd i ]l and converts that optical timing signal (TS$_o$) into an electrical timing signal (TS$_e$) that is then electrically distributed to the associated user circuit 26 via contentention mechanism 22 and a timing signal line 29. The optical timing signal (TS$_o$) is generated in switch 13 and distributed concurrently to each of the N modules $11_1$-$11_N$ to synchronize the modules $11_1$-$11_N$ and insure that each module $11_i$ has a timing signal which is within several nanoseconds of all of the other modules.

User circuit 26 is electrically connected to optional addressing and/or contention mechanism 22 by a plurality of K receive lines $28_1$-$28_K$, a plurality of K transmit lines $27_1$-$27_K$, and a timing signal line 29 (TS$_e$). Mechanism 22 is transparent to user circuit 26 when user circuit 26 is receiving data from backplane 10 via the receive lines $28_1$-$28_K$, but not when user circuit 26 attempts to transmit onto backplane 10. When the associated user circuit 26, of a sending module $11_i$, needs to transmit through a backplane 10 to a user circuit 26 on another module $11_j$, the contention circuit of mechanism 22 of the sending module $11_i$ determines when its module $11_i$ is allowed to access backplane 10. When the contention circuit of mechanism 22 determines that its module $11_i$ is allowed to have access to backplane 10, user circuit 26 then sends electrical data signals in parallel over the transmit lines $27_1$-$27_K$ to the backplane interface logic block 21 of module $11_1$. The addressing circuit of mechanism 22 (1) when transmitting associates the electrical data signal with a destination user circuit 26 on one or more modules 11 associated with backplane 10, and (2) when receiving it identifies whether the electrical data signal is destined for its associated user circuit 26. The plurality of transmit ports $23_1$-$23_K$ within backplane interface logic block 21 then convert the received parallel electrical signals to optical signals and transmit these optical signals in parallel via the K optical fibers $37_1$-$37_K$ in multifiber ribbon 12]hd i ]l to backplane 10. The parallel optical signals are distributed by backplane 10 via multifiber ribbons $12_1$-$12_N$ to each module $11_1$-$11_N$ connected to backplane 10. In each of the modules $11_1$-$11_N$ the parallel optical signals are received on the K optical fibers $38_1$-$38_K$ by a plurality of receive ports $24_1$-$24_K$. The receive ports $24_1$-$24_K$ in each module $11_1$-$11_N$ concurrently (1) convert the parallel received optical signals to electrical signals, and (2) transmit the parallel electrical signals to their associated user circuit 26 via addressing and/or contention mechanism 22 and receive lines $28_1$-$28_K$. When the functions of the optional address and contention circuits in mechanism 22 are placed alternatively in user circuit 26, the above described functions of these circuits will be performed in user circuit 26.

It is to be understood that module $11_i$, as shown in FIG. 2, is for purposes of illustration and not for purposes of limitation, and that module $11_i$ could include (1) any conventional means for providing a suitable contention mechanism 22 with the above characteristics, and (2) any suitable and commonly available optical devices to implement the functions of the transmit ports 23, receive ports 24, and timing port 25. For example, as shown in FIG. 2 by the dashed line 19, the contention circuit of mechanism 22 can be electrically interconnected to all other contention circuits of backplane 10. In addition, the functionality of the user circuit 26 is not intended to be a limitation or part of the present invention. User circuit 26 is simply representative of a source and destination for the electrical signals to and from backplane 10 and could reside either on or external to module $11_i$. User circuit 26 could comprise data processing, data storage, and/or peripheral control devices.

Figure 3:
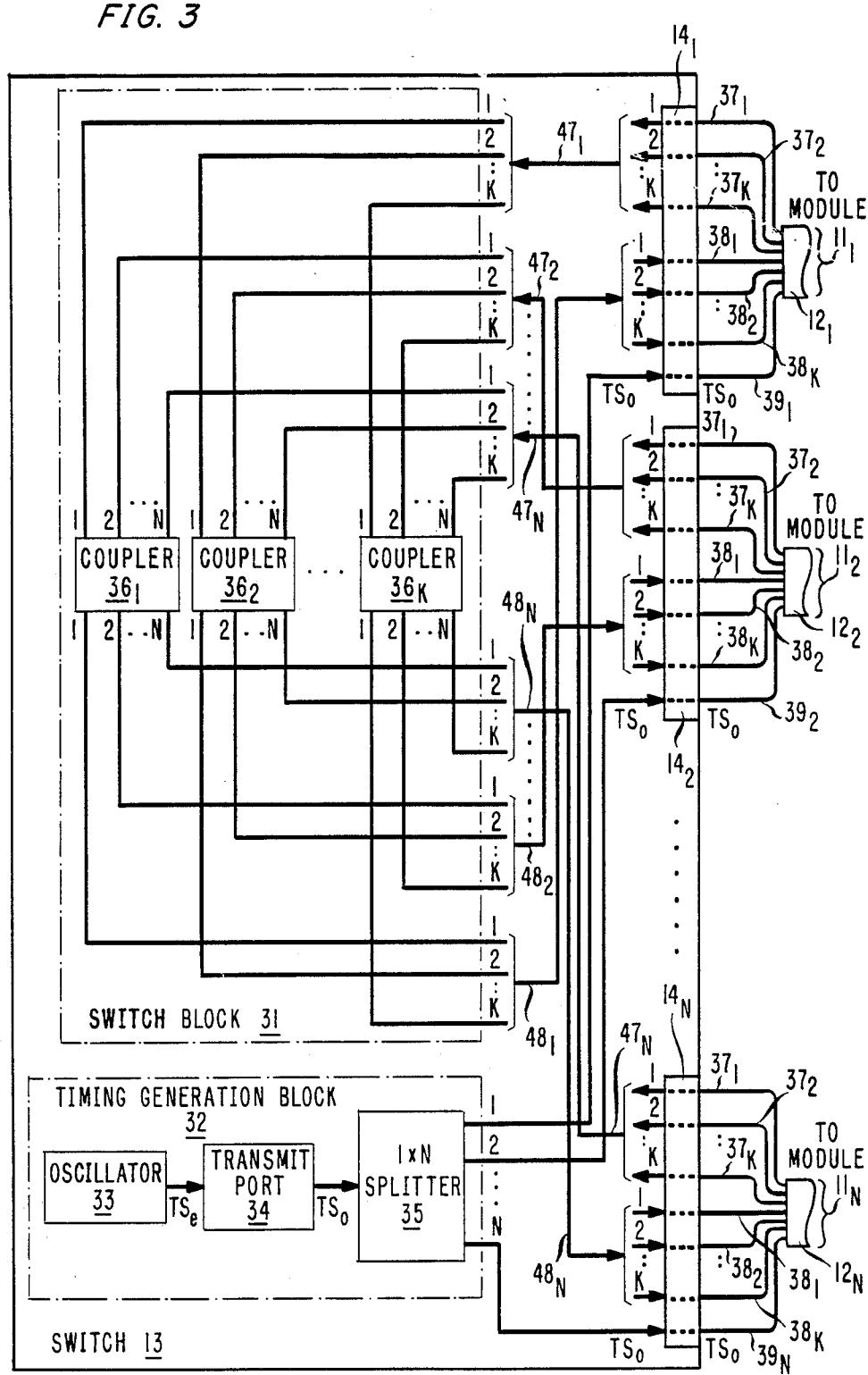
FIG. 3 is a block diagram illustrating in greater detail a switch shown in the optical backplane of FIG. 1.

FIG. 3 is a block diagram illustrating switch 13 in greater detail. Switch 13 is shown as comprising a switching block 31, an exemplary timing generation block 32, and a plurality of N multifiber connectors $14_1$–$14_N$. Switch 13 is responsible for receiving K parallel optical signals from any sending module $11_i$ ]hd i ]l during a predetermined period of time and then forwarding these K parallel optical signals to all of the N modules $11_1$–$11_N$ connected thereto. Each of the N mlutifiber connectors $14_1$–$14_N$ connects both the set of K optical fibers $37_1$–$37_K$ and the set of K optical fibers $38_1$–$38_K$ from a corresponding multifiber ribbon $12_1$–$12_N$ to one of N sets of internal receive optical fibers $47_1$–$47_N$ and one of N sets of internal transmit optical fibers $48_1$–$48_N$, respectively. The set of K optical fibers $37_1$–$37_K$ carries optical signals from a separate one of modules $11_1$–$11_N$ to switch 13 and the set of K optical fibers $38_1$–$38_K$ carries optical signals from switch 13 to a separate one of modules $11_1$–$11_N$. Each set of internal receive optical fibers $47_i$ comprises a plurality of K individual optical fibers, with each optical fiber corresponding to one of the K optical fibers $37_1$–$37_K$ in multifiber ribbon $12_i$. Similarly, each set of internal transmit optical fibers $48_i$ comprises a plurality of K individual optical fibers, with each optical fiber corresponding to one of the K optical fibers $38_1$–$38_K$ in multifiber ribbon $12_i$. The other end of both sets of internal optical fibers $47_i$ and $48_i$, are connected to opposite sides of a pluarlity of K passive optical star couplers $36_1$–$36_K$ within switching block 31.

Switching block 31 comprises a plurality of K passive optical star couplers $36_1$–$36_K$, a separate passive optical coupler $36_i$ for each of the plurality of K optical information signals in either one of the sets of internal optical fibers, $47_i$ and $48_i$. Switching block 31 receives a plurality of K parallel optical signals from one of the N sets of the internal receive optical fibers $47_1$–$47_N$, and couples these K parallel optical signals via couplers $36_1$–$36_K$ to each of the N sets of the internal transmit optical fibers $48_1$–$48_N$ going to each of the multifiber connectors $14_1$–$14_N$. Each of the passive optical couplers $36_i$ includes N input ports and N output ports for coupling an optical signal received on any of the N input ports to all of the N output ports. Each of the N inputs ports of each optical coupler 36 is connected to a separate correspondingly numbered optical fiber within each set of internal receive optical fibers $47_1$–$47_N$ coming from each of the N multifiber connectors $14_1$–$14_N$, and each of the N output ports of each optical coupler 36 is connected to a separate correspondingly numbered optical fiber within each set of internal transmit optical fibers $48_1$–$48_N$ going to each of the N multifiber connectors $14_1$–$14_N$.

It is to be understood that the present backplane could also operate with modules $11_i$ that may only require to transmit information to other modules $11_i$ and not receive information from other modules $11_i$, as may be found for modules that provide broadcast messages on the backplane. Alternatively, the present backplane could also operate with modules $11_i$ that may only require to receive information from other modules $11_i$ and not transmit information to other modules $11_i$, as may be found for modules functioning as monitors on the backplane. Under such conditions, when using the exemplary optical couplers $36_1$–$36_N$ with an equal number of N input ports and N output ports, a transmit only module $11_i$ would only use optical fibers $37_1$–$37_K$ in multifiber ribbon $12_i$ to transmit information to backplane 10; and a receive only module $11_i$ would only use optical fibers $38_1$–$38_K$ in multifiber ribbon $12_i$ to receive information from backplane 10. It is to be understood, however, that the exemplary use in FIG. 3 of optical star couplers $36_1$–$36_K$ with an equal number of N input ports and N output ports is not to be a limitation on the present invention. Any suitable optical coupler with the above described characteristics could be used and still remain within the spirit and scope of the present invention.

Figure 4:
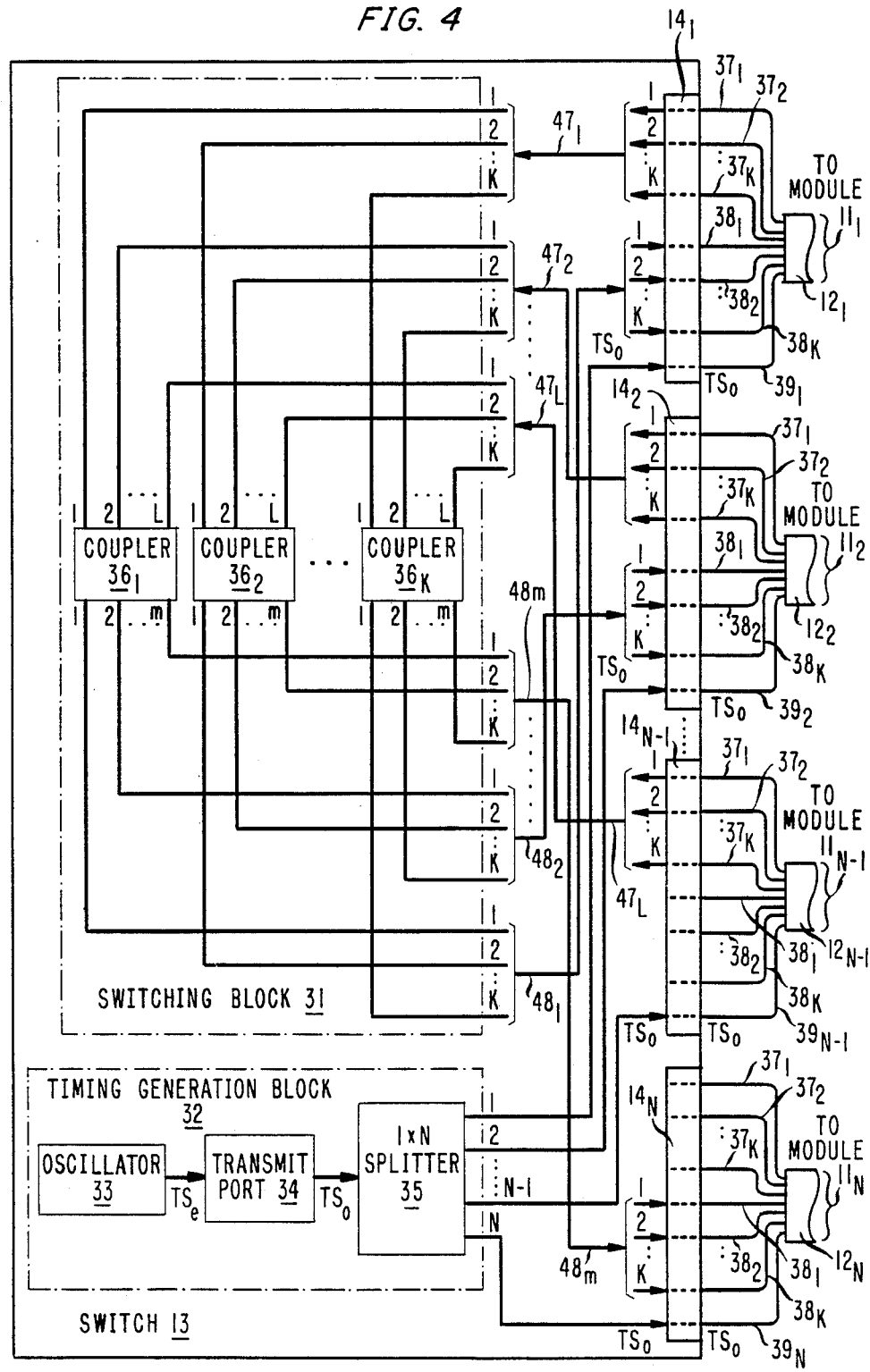
FIG. 4 is a block diagram illustrating an alternative embodiment for a switch shown in the optical backplane of FIG. 1.

FIG. 4 shows an alternative embodiment of switch 13 that includes a plurality of K optical star couplers $36_1$–$36_K$ with L input ports and M output ports, where L and M are equal to or less than N and where L can be equal to or different from M. In FIG. 4, multifiber ribbon $12_{N-1}$ is connected to multifiber connector $14_{N-1}$ and at the distant end to a transmit only module $11_{N-1}$. Multifiber connector $14_{N-1}$ only connects (1) the K optical fibers $37_1$–$37_K$ from multifiber ribbon $12_{N-1}$ to switching block 31 via the set of internal receive optical fibers $47_L$, and (2) the timing generation block 32 to optical timing fiber $39_{N-1}$. Optical fibers $38_1$–$38_K$ in mulifiber ribbon $12_{N-1}$ are not connected to switching block 31 since they are not required by the distant transmit only module $11_{N-1}$. A similar arrangement is obtained when connecting a distant receive only module $11_N$ to multifiber connector $14_N$ on switch 13 via multifiber ribbon $12_N$. However, with this arrangement, multifiber connector $14_N$ only connects (1) switching block 31 to the K optical fibers $38_1$–$38_K$ in multifiber ribbon $12_N$ via a set of internal transmit optical fibers $48_M$, and (2) timing generation block 32 to optical timing fiber $39_N$. Optical fibers $37_1$–$37_K$ in multifiber ribbon $12_N$ are not connected to switching block 31 since they are not required by the distant receive only module $11_N$. It is to be understood that in FIG. 4 each of the internal optical fibers $47_1$–$47_L$ and $48_1$–$48_M$ may have one or up to K optical fibers dependent on the type of signal being received or transmitted respectively over that internal optical fiber. It is to be further understood that the number of L input ports and the number of M output ports of each coupler $36_1$–$36_K$ can be different for each coupler 36 dependent on the signals received from the associated one or more internal optical fibers $47_1$–$47_L$ and transmitted to internal optical fibers $48_1$–$48_M$. For example, a signal from module $11_1$ can comprise a video signal requiring K optical fibers whereas a signal from module $11_2$ can comprise a voice signal requiring only one optical fiber.

The exemplary timing generation block 32, shown in both FIG. 3 and FIG. 4, provides an optical timing signal ($TS_o$) to optical backplane 10 to synchronize all of the associated N modules $11_1$–$11_N$ and the user circuits 26 connected thereto. Timing generation block 32 includes an exemplary single crystal oscillator 33 for generating an electrical timing signal ($TS_e$), an optical transmit port 34 for converting the electrical timing signal ($TS_e$) into an optical timing signal ($TS_o$), and a 1-to-N optical splitter 35 to split the optical timing signal ($TS_o$) for distribution to each of the N modules $11_1$–$11_N$. Each of the associated N optical outputs from optical splitter 35 is connected via the N multifiber connectors $14_1$–$14_N$ to the corresponding optical fiber $39_i$ assigned to carry the optical timing signal ($TS_o$) in each of the N multifiber ribbons $12_1$–$12_N$ to the separate one of the associated modules $11_1$–$11_N$ connected to the other each of each multifiber ribbon $12_1$–$12_N$. Alternatively, it is to be understood, the timing signal can be distributed electrically to each module or broadcast by free-space electromagnetic radiation to each module.

Figure 5:
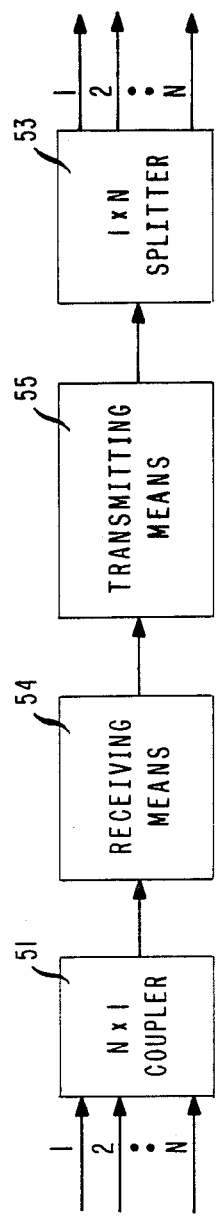
FIG. 5 is a block diagram of a N-to-N active coupler.

In the foregoing discussion, it is to be understood that the above-described embodiment is simply illustrative of an optical backplane architecture for interconnecting circuit modules. Other suitable variations and modifications could be made to either one or all of optical backplane 10 in FIG. 1, module 11$_i$ in FIG. 2, or switch 13 in FIG. 3 and FIG. 4, and still remain within the spirit and scope of the present invention. For example, an alternative to the using the K passive optical couplers 36$_1$–36$_K$, shown in FIG. 3, is to implement the switching block using one or up to K active couplers. More particularly, the N-to-N passive optical couplers 36$_1$–36$_K$ would be replaced with an N-to-N active coupler 50 like that shown in FIG. 5. Such exemplary N-to-N active coupler 50 can comprise an N-to-1 passive coupler 51, followed by an optical-to-electrical receiving means 54, an electrical-to-optical transmitting means 55, and then a 1-to-N passive optical splitter 53.

What is claimed is:

1. A backplane for interconnecting a plurality of N associated user circuits, wherein the backplane comprises:
   a plurality of K optical couplers, each of the optical couplers includes a plurality of L input ports and a plurality of M output ports, where (1) a signal received at any one of the L input ports is distributed to each of the M output ports, (2) L can be equal to or different from M, and (3) L and M can be equal to or less than N, and each of the corresponding ones of the L input ports of the plurality of K optical couplers being both associated with a separate one of the N associated user circuits and capable of receiving a separate one of up to K parallel signals forming a transmission signal from the associated user circuit, and each of the corresponding ones of the M output ports of the plurality of K optical couplers being both associated with a separate one of the N associated user circuits and capable of transmitting a separate one of up to K parallel signals forming a transmission signal to the associated user circuit; and
   means for transmitting a timing signal concurrently to each of the N associated user circuits for synchronizing the N user circuits.

2. A backplane according to claim 1 wherein the timing signal transmitting means comprises:
   an optical timing source for generating an optical timing signal; and
   a 1-to-N optical splitter including a single input port an a plurality of N output ports, said input ports being connected to the optical timing source for receiving the optical timing signal and each of the N output ports being arranged for optical connection to a separate one of the N user circuits for distributing the optical timing signal to each of the N user circuits.

3. A backplane according to claim 2 wherein the optical timing source comprises:
   means for generating an electrical timing signal; and
   an optical transmit port for converting the electrical timing signal into the optical timing signal.

4. A backplane according to claim 1 or 2 further comprising a plurality of N modules for interfacing each of the N user circuits to the plurality of K optical couplers, each of the N modules being connected to a separate water circuit on one side and to the plurality of K optical couplers on the other side, wherein each of the N modules includes a plurality of K optical transmit ports, each optical transmit port being responsible for sending a separate of up to K parallel signals to the associated corresponding one of the L input ports of the plurality of K optical couplers associated with said transmitted signals, and a plurality of K optical receive ports, each optical receive port being responsible for receiving a separate one of the up to K parallel signal from the associated corresponding one of the M output ports of the plurality of K optical couplers associated with said received signals.

5. A backplane according to claim 4 wherein each of the N modules includes a timing port for converting the timing signal, received from the timing signal transmitting means, into an electrical timing signal that is distributed to the user circuit connected to each module.

6. A backplane according to claim 5 wherein each of the N modules includes a contention circuit for determining an instant in time when the associated module will be permitted to transmit the plurality of up to K parallel signals from its plurality of K optical transmit ports.

7. A backplane according to claim 5 wherein each of the N modules includes an addressing circuit for (1) associating the plurality of up to K parallel signals being transmitted from the associated module with a destination user circuit on another module, and (2) identifying whether the plurality of up to K parallel signals being received by the associated module are destined for its associated user circuit.

8. A backplane according to claim 4 wherein each of the N modules includes a contention circuit for determining an instant in time when the associated module will be permitted to transmit the plurality of up to K parallel signals from its plurality of K optical transmit ports.

9. A backplane according to claim 4 wherein each of the N modules includes an addressing circuit for (1) associating the plurality of up to K parallel signals being transmitted from the associated module with a destination user circuit on another module, and (2) identifying whether the plurality of up to K parallel signals being received by the associated module are destined for its associated user circuit.

10. A backplane according to claim 1 wherein each of the optical couplers comprises:
   an N-to-1 optical coupler including a plurality of N input ports and a single output port for coupling optical signals received on the N input ports to the output port;
   receiving means for converting the optical signal received from the output port of the N-to-1 optical coupler into a representative electrical output signal;
   transmitting means for converting the representative electrical output signal from the receiving means into a representative optical output signal; and
   a 1-to-N optical splitter including a single input port and a plurality of N output ports for distributing the representative optical output signal from the transmitting means to each of the N output ports.

* * * * *